United States Patent [19]
Satran et al.

[11] Patent Number: 6,152,658
[45] Date of Patent: Nov. 28, 2000

[54] MODULAR CUTTING TOOL ASSEMBLY

[75] Inventors: Amir Satran, Kfar Vradim; Rafi Sokol, Moshav Shvai Tzion, both of Israel

[73] Assignee: Iscar Ltd., Tefen, Israel

[21] Appl. No.: 09/263,094

[22] Filed: Mar. 5, 1999

[30] Foreign Application Priority Data

Mar. 16, 1998 [IL] Israel ......................................... 123685

[51] Int. Cl.$^7$ .................................................. B23B 27/16
[52] U.S. Cl. .......................... 407/103; 407/113; 407/114; 407/120
[58] Field of Search ..................... 407/103, 102, 407/101, 113, 114, 120

[56] References Cited

U.S. PATENT DOCUMENTS

| | | | |
|---|---|---|---|
| 1,459,805 | 6/1923 | Tasker | 407/103 X |
| 3,052,951 | 9/1962 | Kubota . | |
| 3,176,377 | 4/1965 | Milewski | 407/103 |
| 3,192,602 | 7/1965 | Copeland | 407/103 |
| 3,268,977 | 8/1966 | Diemond | 407/103 |
| 3,792,515 | 2/1974 | Lundgren . | |
| 4,190,388 | 2/1980 | Mullane et al. . | |
| 4,214,847 | 7/1980 | Kraemer . | |
| 4,714,384 | 12/1987 | Lagerberg . | |
| 5,145,294 | 9/1992 | Flueckiger . | |
| 5,160,228 | 11/1992 | Arai et al. | 407/103 |
| 5,308,197 | 5/1994 | Little | 407/113 |
| 5,314,269 | 5/1994 | Arai et al. . | |
| 5,346,336 | 9/1994 | Rescigno . | |
| 5,529,440 | 6/1996 | Schmidt | 407/113 |

*Primary Examiner*—Henry W. H. Tsai
*Attorney, Agent, or Firm*—Mark M. Friedman

[57] ABSTRACT

A modular cutting tool assembly inludes a tool holder having at least one insert receiving pocket, and at least two cutting inserts interchangeably receivable within the pocket. The pocket has a first lateral support surface forming an angle $\theta$ with a second lateral support surface as measured in a plane perpendicular to the pocket axis. Each of the cutting inserts has a peripheral flank surface configured to provide a number of abutment features appropriately angled for positioning in abutment with the lateral support surfaces. The peripheral flank surface of one cutting insert is further configured to provide at least two cutting points having a first nose angle, and the peripheral flank surface of the other cutting insert is further configured to provide at least two cutting points having a second nose angle different from the first nose angle.

8 Claims, 9 Drawing Sheets

MODULAR CUTTING TOOL ASSEMBLY

FIELD AND BACKGROUND OF THE INVENTION

The present invention relates to cutting tools and, in particular, it concerns a modular cutting tool assembly in which cutting inserts with different cutting point nose angles may be used interchangeably.

It is known to employ cutting inserts made of various hard materials which have polygonal, round, or otherwise rotationally symmetric cutting edges mounted in a receiving pocket of the tool holder of a cutting tool. During a machining operation (turning, milling, etc.), a portion of the available cutting edge cuts the workpiece, typically along edges adjacent to a cutting point. When the cutting edges adjacent to one point of a regular insert have been worked, the insert is indexed to present a whole new cutting point.

Many different forms of cutting inserts are commonly used. In turning operations, for example, one of the primary criteria for selecting an appropriate insert type is the nose angle required. In order to define the term "nose angle", it should be noted that most cutting points as seen in plan view are made up of two straight or low-curvature lines meeting at a point, sometimes modified by rounding to a relatively small nose radius in the point region. The angle which would be made between the straight or low-curvature lines, disregarding the rounding of the point itself, is referred to herein as the "nose angle". The nose angle so defined generally has a well defined value for any cutting insert with the notable exception of round inserts in which the nose radius becomes the radius of the entire insert cutting geometry.

Figure 1:
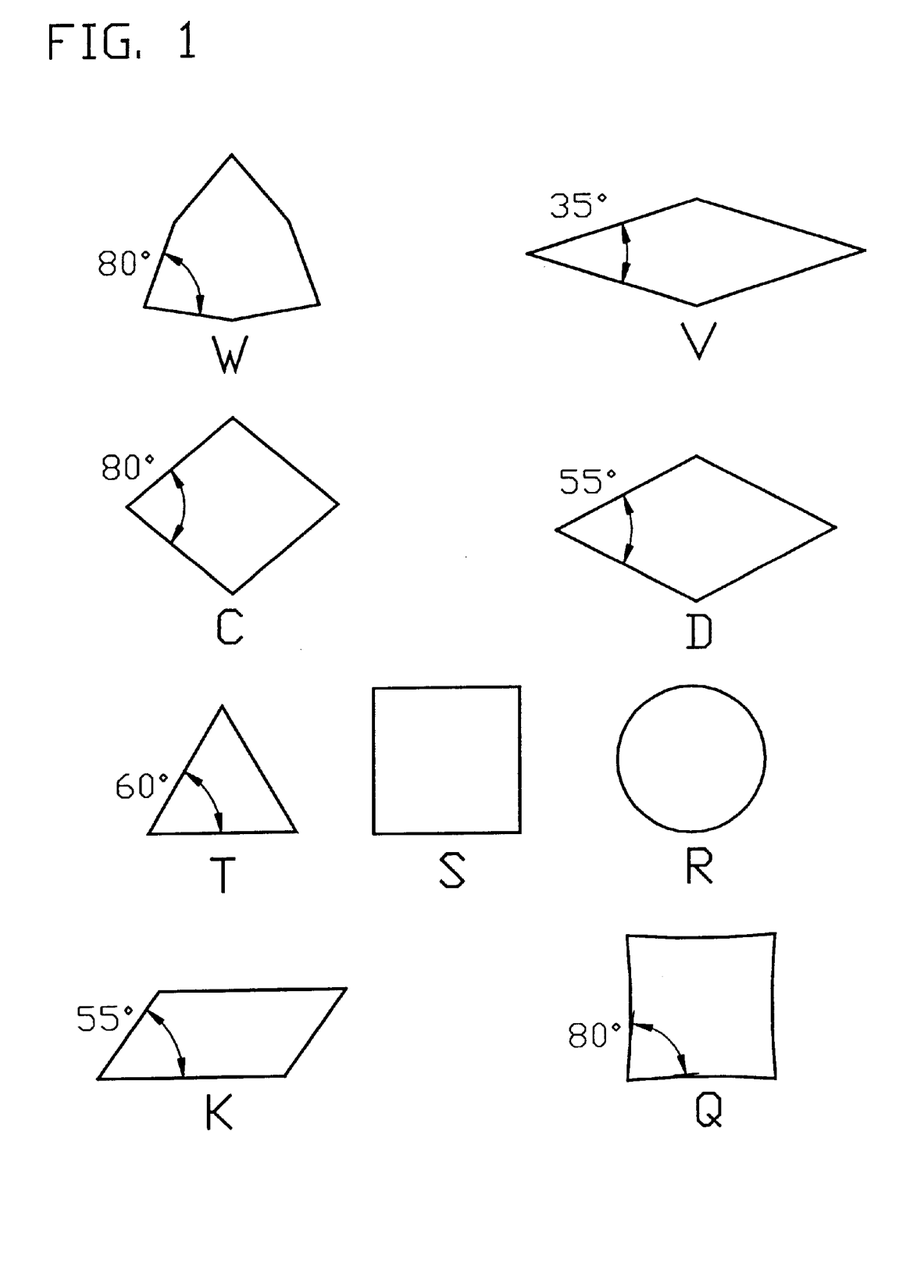
FIG. 1 is a key to the conventional nomenclature used to refer to polygonal cutting insert shapes.

A range of nose insert angles are conventionally provided by cutting inserts of various different overall shapes as indicated in FIG. 1. Near 90° angles are provided by "S" type square inserts. Eighty degree cutting points are provided by "Q" type concave-sided square, "W" type convex triangle or "Trigon", and "C" type diamond. Sixty degree cutting points are provided by "T" type triangular inserts. Smaller nose angles are typically provided by diamond shapes such as the 55° "D" type and 35° "V" type, or by the "K" type 55° parallelogram.

Clearly, the requirements for effectively restraining these different types of cutting insert within a pocket are highly specific to the geometry of the cutting edge. Thus each type of insert is provided with a dedicated tool holder design with a corresponding pocket shape. As a result, the use of multiple insert types is accompanied by the expense of providing and storing multiple tool holders, and necessitates the additional labor of exchanging the entire tool between cutting operations.

In an attempt to reduce these costs and labor, modular systems based on replaceable cartridges have been developed. These systems employ replaceable adapter cartridges each of which provides a pocket with clamping geometry suited to a specific cutting insert. Although these systems do allow the primary tool holder to be used with different cutting insert types, the replacement of the cartridges still adds a wasteful additional dissembly/assembly step to the changeover.

There is therefore a need for a modular cutting tool assembly which allows alternate use of multiple cutting inserts with differing nose angles within a single tool holder pocket. There is also a need for cutting inserts and tool holders for use in such an assembly.

SUMMARY OF THE INVENTION

The present invention is a modular cutting tool assembly and corresponding insert design which allow alternate use of multiple cutting inserts with differing nose angles within a single tool holder pocket.

According to the teachings of the present invention there is provided, a modular cutting tool assembly comprising: (a) a tool holder having at least one insert receiving pocket with a base and a plurality of lateral support surfaces, reference being made to a pocket axis of the insert receiving pocket with which an axis of symmetry of an insert is to be aligned, a first of the lateral support surfaces forming an angle $\theta$ with a second of the lateral support surfaces as measured in a plane perpendicular to the pocket axis; (b) at least two cutting inserts interchangeably receivable within the pocket, each of the cutting inserts having an upper surface, a bottom surface, a peripheral flank surface and an insert axis of rotational symmetry, the peripheral flank surface being configured to provide a plurality of abutment features, a first of the abutment surfaces forming an angle $\theta$ with a second of the abutment surfaces as measured in a plane perpendicular to the insert axis for positioning in abutment with the lateral support surfaces, wherein the peripheral flank surface of a first of the cutting inserts is further configured to provide at least two cutting points having a first nose angle, and wherein the peripheral flank surface of a second of the cutting inserts is further configured to provide at least two cutting points having a second nose angle different from the first nose angle.

According to a further feature of the present invention, $\theta$ is substantially equal to 90°.

According to a further feature of the present invention, the first nose angle is substantially 80°.

There is also provided according to the teachings of the present invention, a cutting insert comprising a unitary structure having an upper surface bounded by a cutting edge, a base, a peripheral flank surface and a central axis, wherein the cutting edge is substantially diamond shaped with a nose angle $\phi < 90°$, the peripheral flank surface being configured to provide a plurality of lateral abutment surfaces forming therebetween angles $\theta$ as measured in a plane perpendicular to the central axis, where $\theta > \phi$.

According to a further feature of the present invention, $\theta$ is substantially 90°.

According to a further feature of the present invention, $\phi$ is substantially 80°.

There is also provided according to the teachings of the present invention, a method for designing a modular cutting tool assembly including a first cutting insert having a plurality of cutting points with a first nose angle and a second cutting insert having a plurality of cutting points with a second nose angle different from the first nose angle, the method comprising the steps of: (a) defining a first cutting geometry for the first cutting insert so as to provide a plurality of cutting points with the first nose angle; (b) defining a second cutting geometry for the second cutting insert so as to provide a plurality of cutting points with the second nose angle; (c) defining a common set of abutment features including a plurality of lateral abutment surfaces angularly spaced around an axis; (d) designing a first peripheral flank surface having an upper portion corresponding to the first cutting geometry and a lower portion providing the common set of abutment features; and (e) designing a second peripheral flank surface having an upper portion corresponding to the second cutting geometry and a lower portion providing the common set of abutment features.

According to a further feature of the present invention, the first cutting geometry and the second cutting geometry have different degrees of rotational symmetry.

According to a farther feature of the present invention, the different degrees of rotational symmetry are 2 and 4.

According to a further feature of the present invention, the plurality of lateral abutment surfaces exhibit four-fold rotational symmetry.

There is also provided according to the teachings of the present invention, a cutting insert comprising a unitary structure having an upper surface bounded by a cutting edge, a base, a peripheral flank surface and a central axis, wherein the cutting edge is configured to provide a plurality of cutting points, at least one of the cutting points having a nose angle $\phi$, the peripheral flank surface being configured to provide a plurality of lateral abutment surfaces, the two of the lateral abutment surfaces closest to the at least one cutting point forming between them an angle $\theta$ as measured in a plane perpendicular to the central axis, where $\theta \neq \phi$.

According to a further feature of the present invention, angle $\phi$ is substantially equal to 80° and angle $\theta$ is substantially equal to 90°.

There is also provided according to the teachings of the present invention, a cutting insert comprising a unitary structure having an upper surface bounded by a cutting edge, a base, a peripheral flank surface and a central axis, wherein the cutting edge includes n substantially straight portions arranged so as to exhibit n-fold rotational symmetry about the central axis, where $n \geq 2$, the peripheral flank surface being configured to provide a plurality of lateral abutment surfaces, the lateral abutment surfaces being located such that lines of intersection between the lateral abutment surfaces and a plane perpendicular to the central axis form an angle $\theta$ relative to a projection of the substantially straight portions onto the plane, where $0 < \theta < 360°/n$.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a modular cutting tool assembly and corresponding insert design which allow alternate use of multiple cutting inserts with differing nose angles within a single tool holder pocket.

The principles and operation of modular cutting tools and cutting inserts according to the present invention may be better understood with reference to the drawings and the accompanying description.

Figure 2:
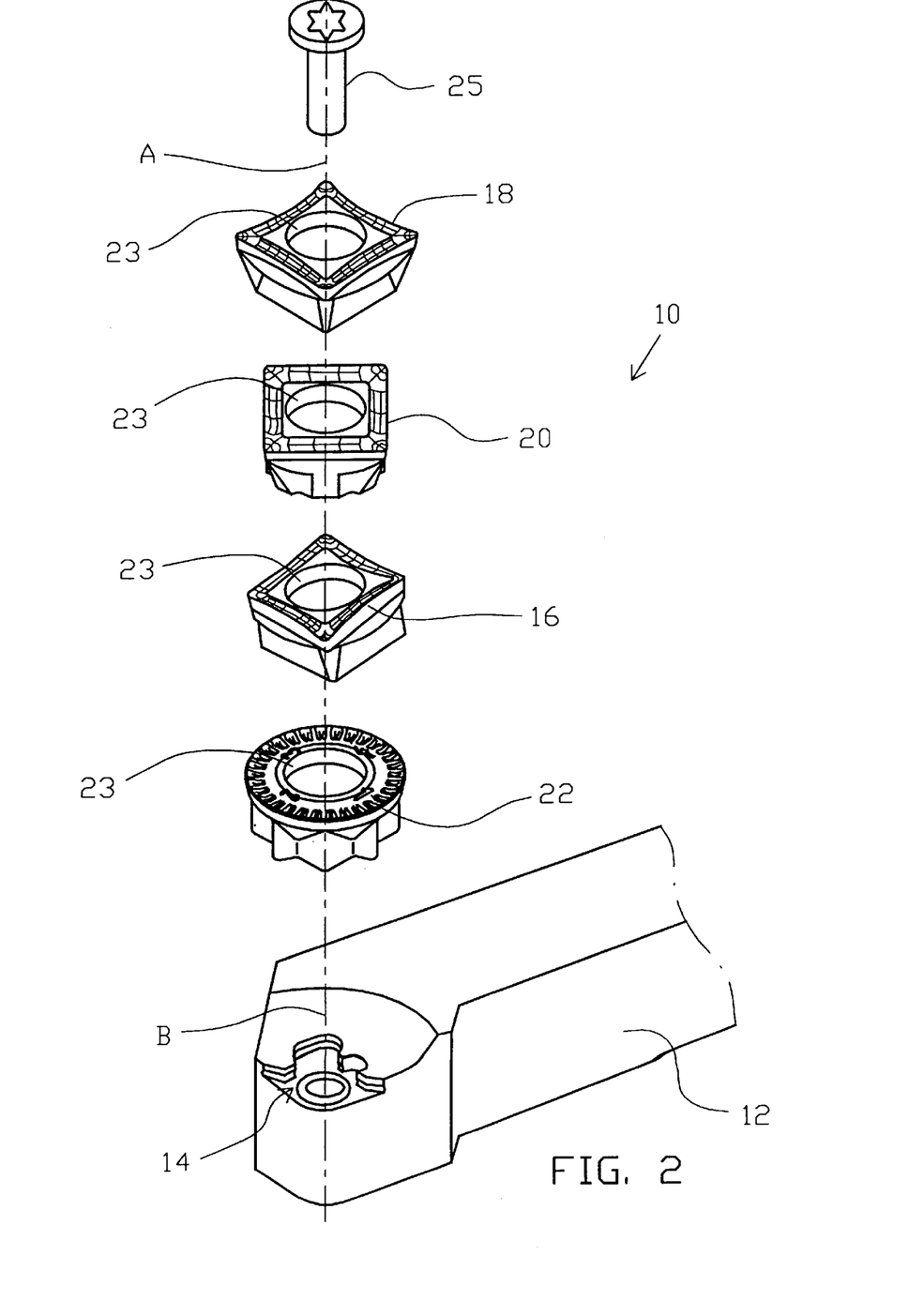
FIG. 2 is an isometric view of a modular cutting tool assembly, constructed and operative according to the teachings of the present invention, including a tool holder and a set of four interchangeable cutting inserts.
Figure 3A:
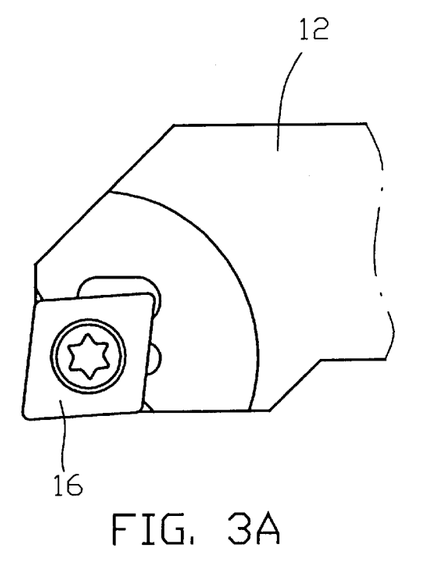
FIGS. 3A–3D are top views of the tool holder of FIG. 2, each view showing a different one of the four cutting inserts attached to the tool holder.
Figure 3B:
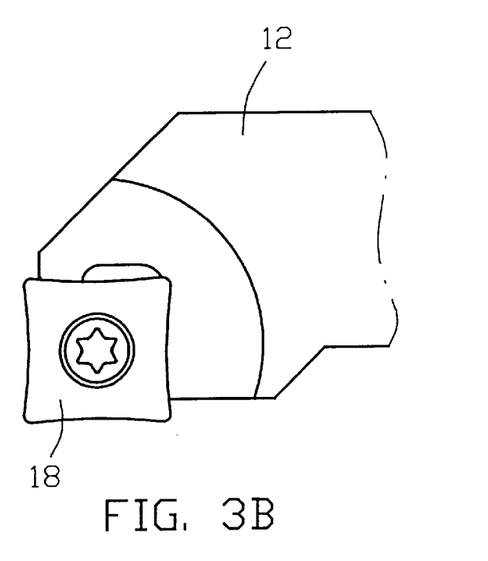
Figure 3C:
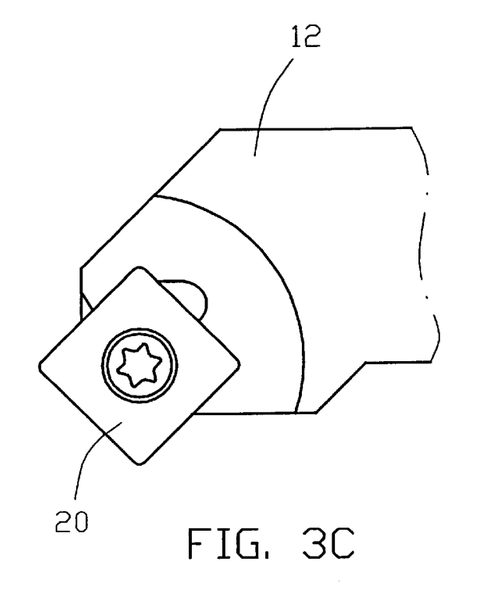
Figure 3D:
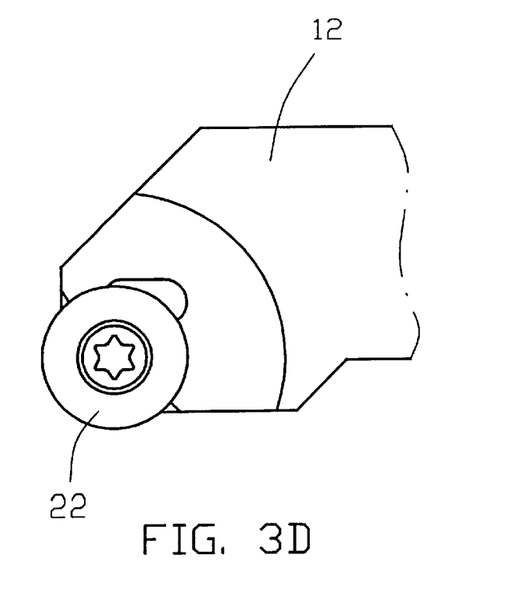

Referring now to the drawings, FIGS. 2 and 3A–3D show a modular cutting tool assembly, generally designated 10, constructed and operative according to the teachings of the present invention, including a tool holder 12 with an insert receiving pocket 14 for receiving a number of interchangeable cutting inserts, exemplified here by cutting inserts 16, 18, 20 and 22. Each cutting insert features a mounting hole 23 which allows the insert to be retained within pocket 14 by use of a clamping screw 25. The structure of pocket 14 is shown in FIGS. 4A and 4B, while the details of the various exemplary inserts are shown in FIGS. 5–8.

Generally speaking, cutting tool assembly 10 provides tool holder 12 having at least one insert receiving pocket 14 with a base 24 and a number of lateral support surfaces 26, 28 and 30. At least two of these lateral support surfaces form between them an angle $\theta$ as measured in a plane perpendicular to an axis of the insert receiving pocket with which the axis of symmetry of an insert is to be aligned. Cutting tool assembly 10 also includes at least two cutting inserts interchangeably receivable within pocket 14. Each of the cutting inserts has a peripheral flank surface configured to provide abutment features. The peripheral flank surface is, in general, divided into an upper relief flank surface proximal to the cutting edge which provides mechanical support for the cutting edge, and a lower flank surface which provides the abutment features. The abutment features form between them an angle $\theta$ as measured in a plane perpendicular to an insert axis of rotational symmetry of the insert axis so as to mate with lateral support surfaces 26, 28 and 30. The peripheral flank surface of one of the cutting inserts is configured to provide cutting points having a first nose angle, and the peripheral flank surface of a second of the cutting inserts is configured to provide cutting points having a second nose angle different from the first nose angle.

Figure 4A:
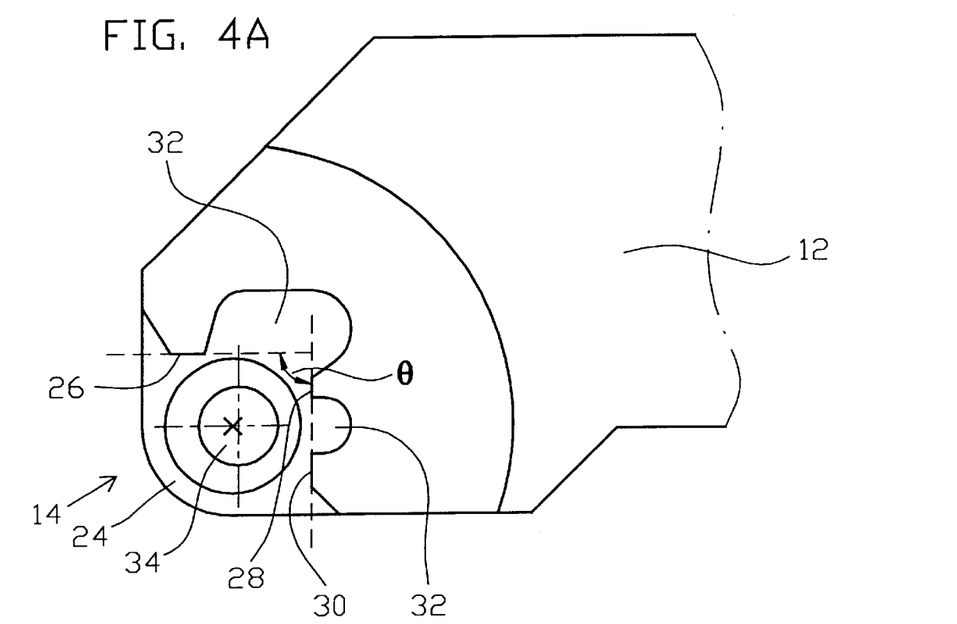
FIG. 4A is a top view of an insert receiving pocket of the tool holder of FIG. 2.
Figure 4B:
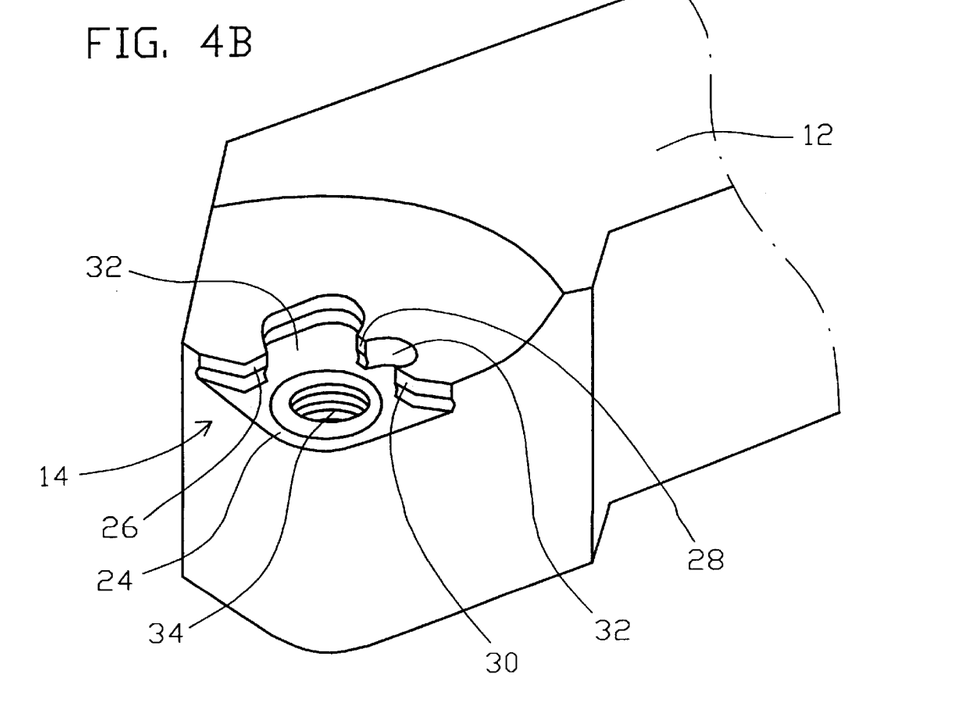
FIG. 4B is an isometric view of the insert receiving pocket of FIG. 4A.

By way of example, the invention is exemplified here by a set of four cutting inserts interchangeably mounted within pocket 14 for which θ is 90° (see FIG. 4A). As will be evident from FIGS. 3A–3D, this set provides inserts with a range of different nose angle options. In addition, the set of inserts may be further supplemented according to the principles of the present invention to provide further options for these and other parameters.

It should be appreciated that the present invention is applicable to a wide range of cutting inserts with rotationally-symmetric cutting edges. The term "rotationally-symmetric" is used herein in the description and claims to refer to shapes which are invariant under rotation through an angle of 360°/n where n is at least two. The term so defined includes diamonds, parallelograms and regular polygons, whether straight-sided or made up of more complex combinations of straight or curved line segments. The term also includes circular shapes. It will be noted that the symmetry of the inserts of the present invention, unless otherwise stated, is taken to refer to the symmetry of the underlying geometry of the cutting edge, independent of secondary features such as chip breaking features or reference indicia. Thus, in certain cases, a repetitive pattern such as serrations, and scalloped or wavy cutting edges may be superimposed over the basic shape. The cutting edge may exhibit equivalent or higher degrees of symmetry than the abutment surfaces. It will be appreciated that rotational symmetry does not imply symmetry under reflection.

Reference will be made throughout the specification and claims to a central axis of an insert A, and an insert-receiving pocket axis B (see FIG. 2). Axis A is the axis about which the cutting edge exhibits rotational symmetry. Reference is also made to the "top" and "bottom" of the insert. Wherever such references appear, the insert is assumed to be mounted with its base downwards so as to present its cutting edge upwards and with its axis vertical. Axis B of the insert receiving pocket is correspondingly defined as a line through the pocket with which the cutting insert axis A is to be aligned.

Turning now to the features of modular cutting tool assembly 10 in more detail, pocket 14 preferably features at least one lateral relief hollow 32. The positioning and size of relief hollows 32 are chosen to provide clearance for various cutting edge lateral reinforcement features of certain inserts without obstructing the lateral support surfaces.

The specific example shown here employs a set of inserts with vertical abutment surfaces, i.e., all standing parallel to axis A of the insert. Correspondingly, lateral support surfaces 26, 28 and 30 are all vertical, i.e., stand parallel to the pocket axis B. It will be clear that this feature is not critical to the present invention and that the insert abutment surfaces and pocket lateral support surfaces could be sloped upwardly outwards with respect to the insert and pocket axes, respectively.

Furthermore, it is important to note that the present invention renders the geometrical characteristics of the abutment surfaces largely independent from those of the upper relief flank surfaces. As a result, the abutment surfaces may be vertical while the upper relief flank surfaces, adjacent to the cutting edges of the inserts described here, are angled to provide inherent relief between the upper relief flank surfaces and the surface of the workpiece being machined.

As mentioned earlier, one of the support surfaces 26 forms an angle θ=90° with one, or in this case both, of the other support surfaces 28 and 30. It will be understood that the innermost support surface, i.e. support surface 28 may be omitted since the remaining support surfaces 26 and 30 fully define an effective lateral support/restraint system. However, in most cases, a three-point or more accurately three-surface support geometry is preferred.

In the example shown here, base 24 is substantially planar and features a central threaded bore 34 for receiving clamping screw 25. Threaded bore 34 is preferably very slightly off-set from the pocket axis to ensure that the abutment surfaces of the insert are biased against the corresponding support surfaces of the receiving pocket. It should be appreciated that the specific clamping technique employed to clamp the cutting inserts within pocket 14 does not, per se, constitute a part of the present invention, and that variations may be made in accordance with any other clamping technique without straying from the scope of the present invention.

Turning now to FIGS. 5A–5E, a diamond shaped cutting insert 16, constructed and operative according to the teachings of the present invention, will be described in more detail. The phrase "diamond shaped" is used herein to denote an insert for which the plan view of the cutting edge corresponds substantially to an equilateral but non-orthogonal parallelogram. Included within this definition are modifications such as rounding of corners and chip-breaking features such as are shown.

Cutting insert 16 has a unitary structure including an upper surface 36 bounded by a cutting edge 38, a base 40, and a peripheral flank surface 42. Cutting edge 38 is substantially diamond shaped. Peripheral flank surface 42 is configured to provide a plurality of lateral abutment surfaces 44 forming therebetween angles of substantially 90° as measured in a plane perpendicular to a central axis of the insert. This makes insert 16 compatible with the orthogonal support surfaces of pocket 14 while providing a nose angle of significantly less than 90°. This structure is particularly advantageous for a diamond shaped cutting edge with a nose angle of substantially 80° replacing the conventional "C" type insert.

Figure 5A:
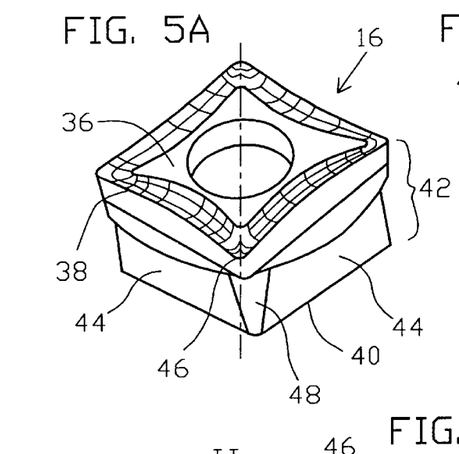
FIG. 5A is an upper isometric view of a first of the cutting inserts from the set of FIG. 2.
Figure 5B:
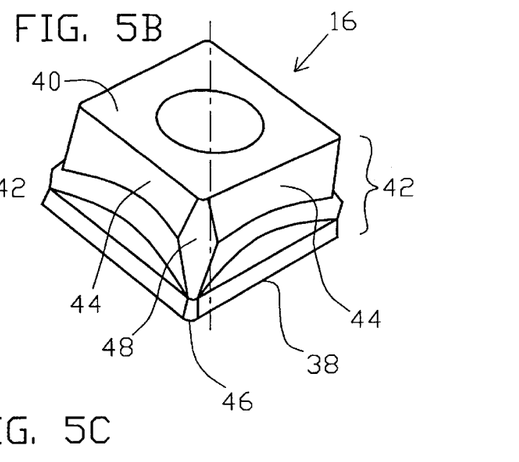
FIG. 5B is a lower isometric view of the cutting insert of FIG. 5A.
Figure 5C:
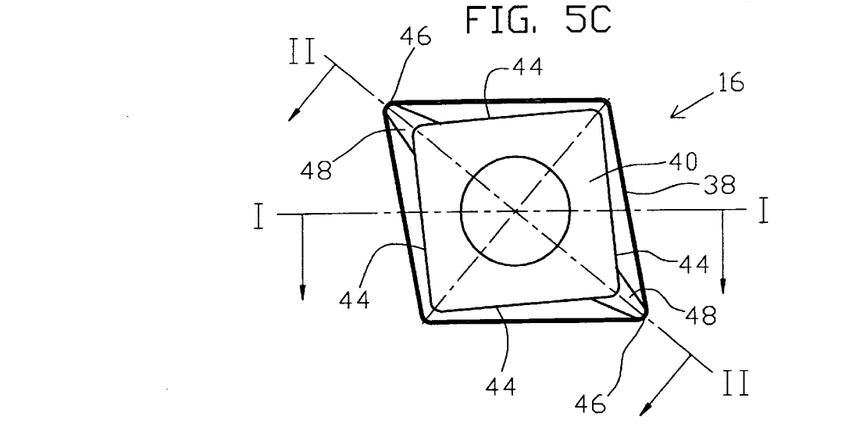
FIG. 5C is a bottom view of the cutting insert of FIG. 5A.
Figure 5D:
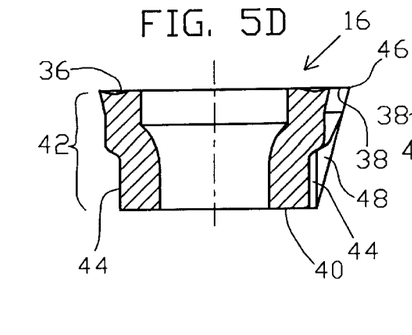
FIG. 5D is a cross-section taken along the line I—I of FIG. 5C.
Figure 5E:
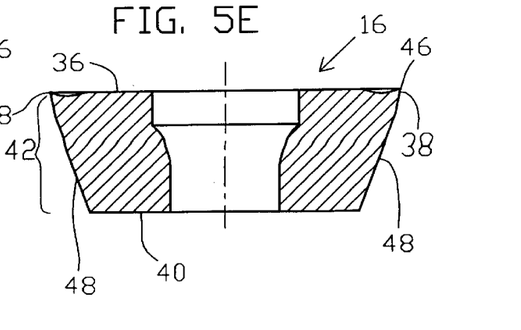
FIG. 5E is a cross-section taken along the line II—II of FIG. 5C.
Figure 6A:
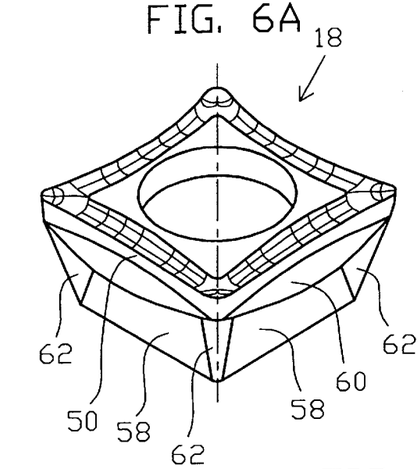
FIG. 6A is an upper isometric view of a second of the cutting inserts from the set of FIG. 2.
Figure 6B:
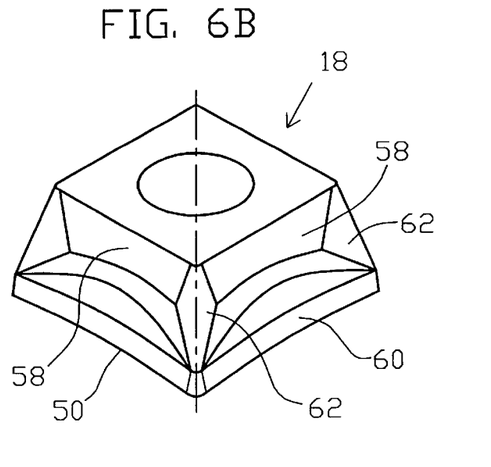
FIG. 6B is a lower isometric view of the cutting insert of FIG. 6A.
Figure 6C:
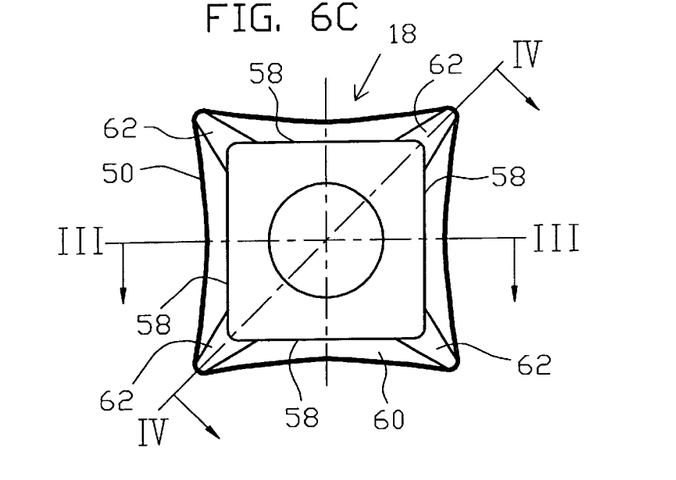
FIG. 6C is a bottom view of the cutting insert of FIG. 6A.
Figure 6D:
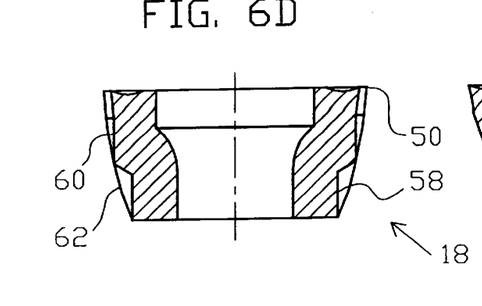
FIG. 6D is a cross-section taken along the line III—III of FIG. 6C.
Figure 6E:
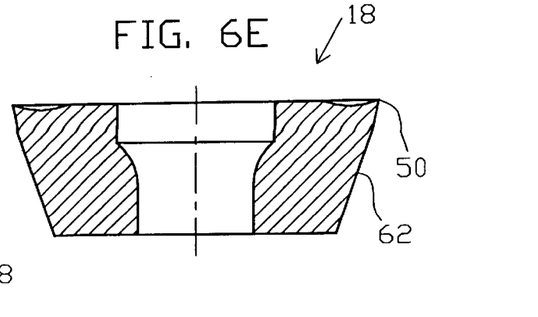
FIG. 6E is a cross-section taken along the line IV—IV of FIG. 6C.
Figure 7A:
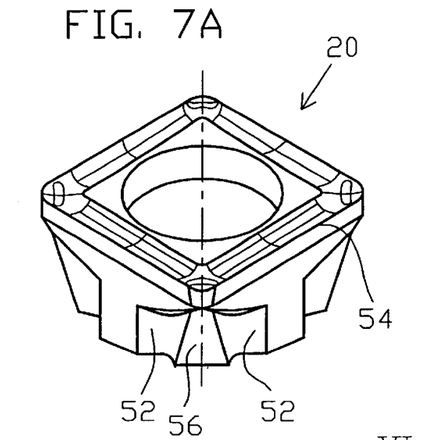
FIG. 7A is an upper isometric view of a third of the cutting inserts from the set of FIG. 2.
Figure 7B:
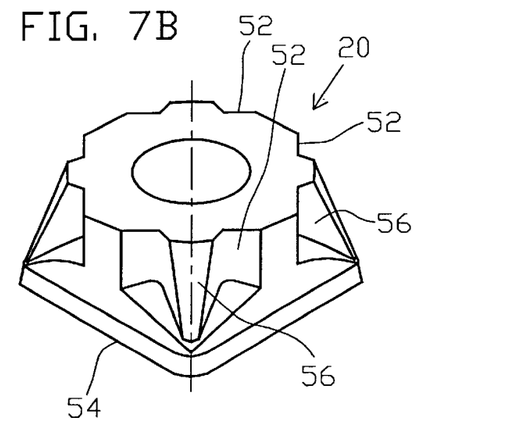
FIG. 7B is a lower isometric view of the cutting insert of FIG. 7A.
Figure 7C:
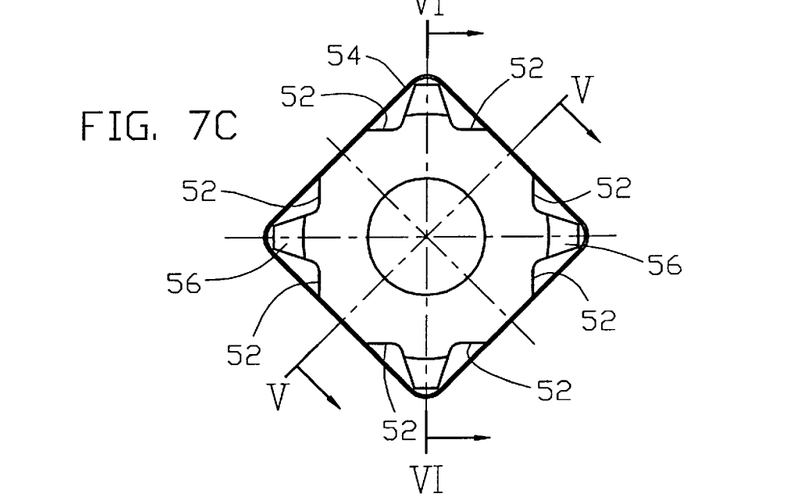
FIG. 7C is a bottom view of the cutting insert of FIG. 7A.
Figure 7D:
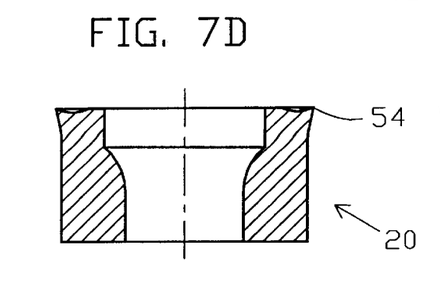
FIG. 7D is a cross-section taken along the line V—V of FIG. 7C.
Figure 7E:
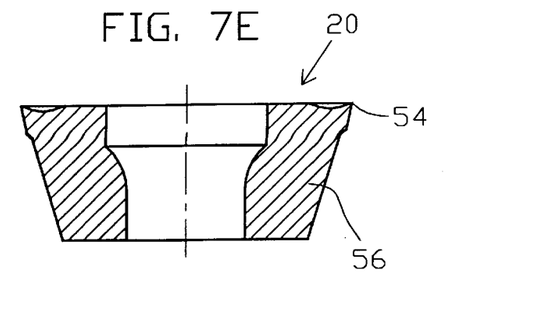
FIG. 7E is a cross-section taken along the line VI—VI of FIG. 7C.
Figure 8A:
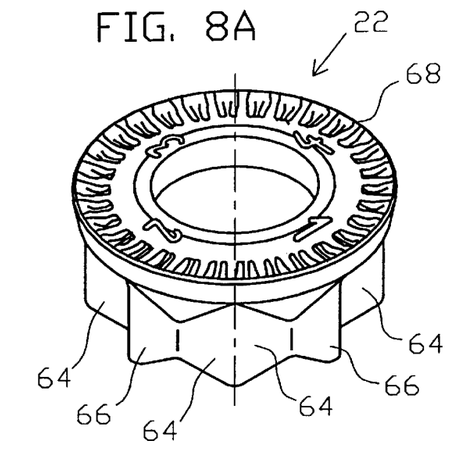
FIG. 8A is an upper isometric view of a fourth of the cutting inserts from the set of FIG. 2.
Figure 8B:
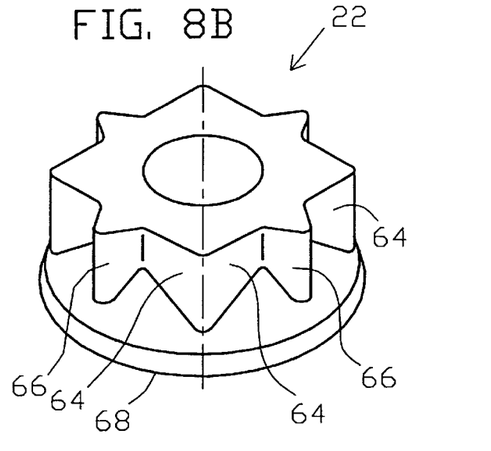
FIG. 8B is a lower isometric view of the cutting insert of FIG. 8A.
Figure 8C:
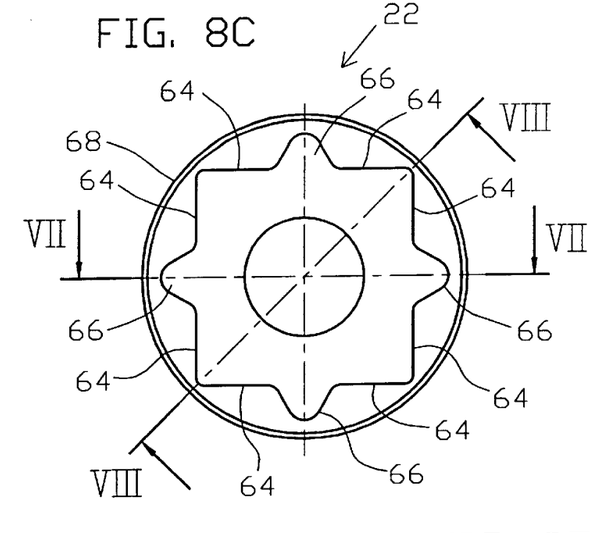
FIG. 8C is a bottom view of the cutting insert of FIG. 8A.
Figure 8D:
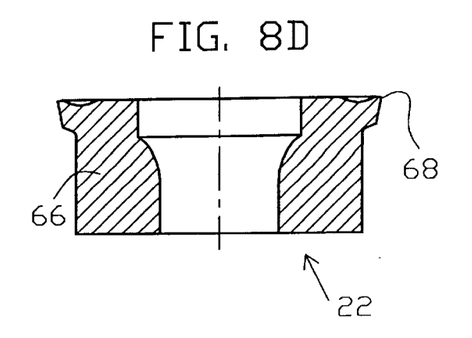
FIG. 8D is a cross-section taken along the line VII—VII of FIG. 8C.
Figure 8E:
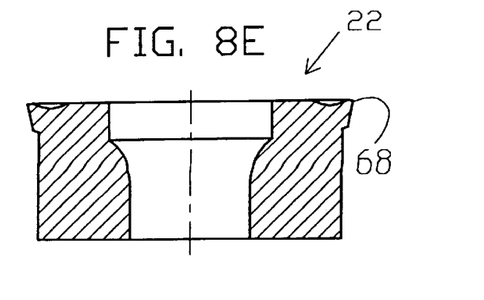
FIG. 8E is a cross-section taken along the line VIII—VIII of FIG. 8C.

Abutment surfaces 44 may be most simply implemented as a square portion of insert 16 adjacent to base 40 (see FIGS. 5C and 5D). In order to provide effective support for the projecting cutting points 46, flank surface 42 preferably also includes tapered reinforcement features 48.

Turning now to FIGS. 6A–6E, these show a cutting insert 18 with a convex-sided square cutting edge 50 replacing the conventional "Q" type insert. Here too, the lower part of the insert assumes a regular square form to provide the required orthogonal abutment surfaces 58 with the upper part 60 of the peripheral flank surfaces being contoured appropriately to support the cutting edge. Specifically, the peripheral flank surface here includes four tapered reinforcement features 62. Insert 18 provides an option of four indexable cutting positions instead of the two of insert 16.

Turning now to FIGS. 7A–7E, these illustrate how an insert, in this case insert 20 with a regular square cutting edge 54, can be configured to provide cutting edges rotated through an angle, here 45°, relative to the orientation of the pocket lateral support surfaces. The implications of this rotation may be appreciated by comparing the orientations of inserts 18 and 20 within pocket 14 as shown in FIGS. 3B and 3C. Clearly, a rotated configuration could equally be constructed with shapes of cutting edge other than a regular square.

The rotated mounting orientation is achieved by providing orthogonal abutment surfaces 52 rotated through about 45° from the directions of the straight portions of cutting edge 54. Support for the corners of the insert is provided by tapered reinforcement features 56 positioned to lie in the lateral relief hollow 32 between the support surfaces of pocket 14 when the insert is mounted therein.

Finally with respect to assembly 10, FIGS. 8A–8E show a circular insert 22 mountable in four indexable positions within pocket 14. Here again, orthogonal abutment surfaces 64 are provided by a primarily square lower portion of the insert with intermediate reinforcement projections 66 lending additional support to the cutting edge 68 at intermediate positions around the insert.

At this stage, it may be appreciated that modular cutting tool assembly 10 may be viewed as the result of a generalizable method for designing a modular cutting tool assembly. The method begins by defining the objective, i.e., choosing at least two particular cutting insert geometries which one wishes to use interchangeably. Based on the desired cutting geometries, a common set of abutment features is chosen. The abutment features include a plurality of lateral abutment surfaces angularly spaced around an axis and lying within the outlines of both desired cutting geometries. For each insert, a peripheral flank surface is then designed to have an upper portion corresponding to the respective cutting geometry and a lower portion providing the common set of abutment features. The orientation of the abutment surfaces is chosen in accordance with a desired orientation of the insert when mounted in the tool holder pocket.

Optionally, the first cutting geometry and the second cutting geometry may have different degrees of rotational symmetry as exemplified by the two-fold symmetry of insert 16 and the four-fold symmetry of insert 18 described above. In this context, the term "degree of rotational symmetry" is used exclusively to refer to the maximum degree of rotational symmetry present.

Figure 9A:
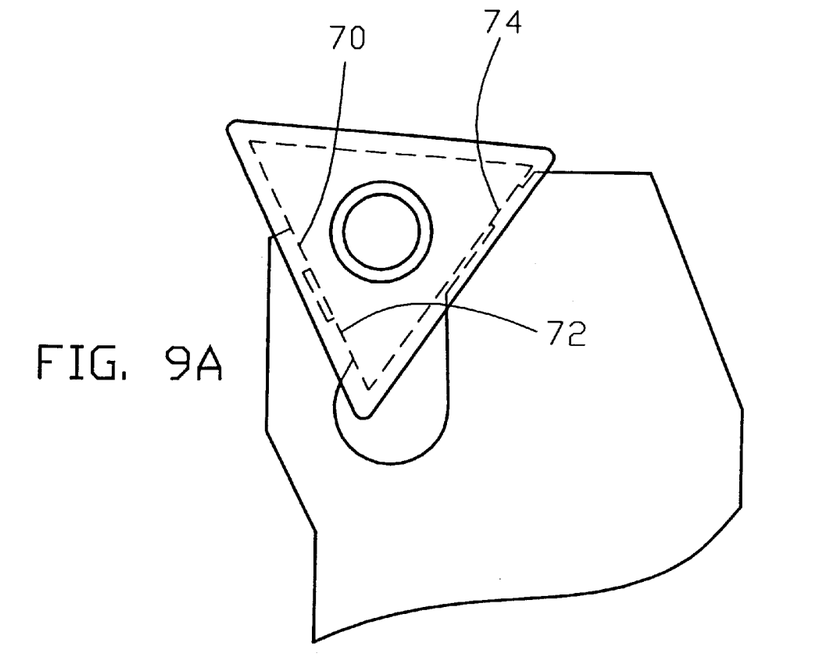
FIGS. 9A and 9B are top views of a further embodiment of a modular cutting tool assembly, each showing a three-fold symmetry insert with a different nose angle.
Figure 9B:
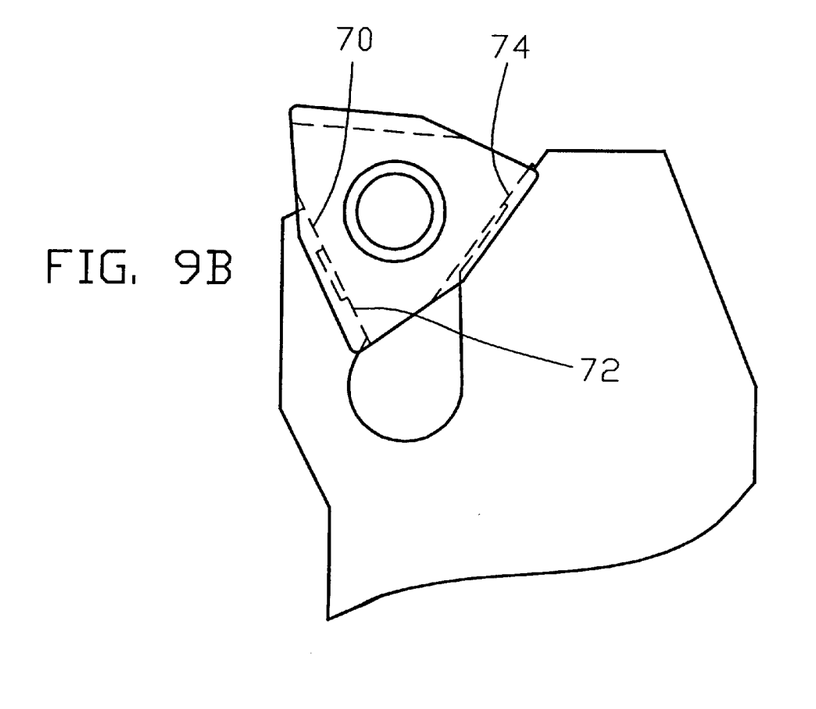

A further application of this method is illustrated schematically in FIGS. 9A and 9B. These show an assembly for a set of cutting inserts with three-fold rotational symmetry. In this example, lateral support surfaces 70 and 72 form an angle of 60° with a third lateral support surface 74.

It will be appreciated that the above descriptions are intended only to serve as examples, and that many other embodiments are possible within the spirit and the scope of the present invention.

What is claimed is:

1. A modular cutting tool assembly comprising:

(a) a tool holder having at least one insert receiving pocket with a base and a plurality of lateral support surfaces, reference being made to a pocket axis of said insert receiving pocket with which an axis of symmetry of an insert is to be aligned, a first of said lateral support surfaces forming an angle $\theta$ with a second of said lateral support surfaces as measured in a plane perpendicular to said pocket axis, where $\theta$ is substantially equal to 90°;

(b) at least two cutting inserts interchangeably receivable within said pocket, each of said cutting inserts having an upper surface bounded by a cutting edge, a bottom surface, a peripheral flank surface and an insert axis of rotational symmetry, said peripheral flank surface being configured to provide a plurality of abutment surfaces, a first of said abutment surfaces forming an angle $\theta$ with a second of said abutment surfaces as measured in a plane perpendicular to said insert axis for positioning in abutment with said lateral support surfaces, wherein said cutting edge of a first of said cutting inserts is configured to provide at least two cutting points each having a first nose angle measured between portions of said cutting edge substantially equal to 80°, and wherein said cutting edge of a second of said cutting inserts is configured to provide at least two cutting points each having a second nose angle different from said first nose angle.

2. A cutting insert comprising a unitary structure having an upper surface bounded by a cutting edge, a base, a peripheral flank surface and a central axis, wherein said cutting edge is substantially diamond shaped with a nose angle $\phi$ measured between portions of said cutting edge of less than 90°, said peripheral flank surface being configured to provide a plurality of lateral abutment surfaces forming therebetween angles $\theta$ as measured in a plane perpendicular to said central axis, where $\theta > \phi$.

3. The cutting insert of claim 2, wherein $\theta$ is substantially 90°.

4. The cutting insert of claim 3, wherein $\phi$ is substantially 80°.

5. A cutting insert comprising a unitary structure having an upper surface bounded by a cutting edge, a base, a peripheral flank surface and a central axis, wherein said cutting edge exhibits a substantially square shape formed primarily from four substantially straight portions, said peripheral flank surface being configured to provide a plurality of lateral abutment surfaces, said lateral abutment surfaces being located such that lines of intersection between said lateral abutment surfaces and a plane perpendicular to said central axis form an angle of substantially 45° relative to a projection of said substantially straight portions onto said plane.

6. A cutting insert comprising a unitary structure having an upper surface bounded by a cutting edge, a base, a peripheral flank surface and a central axis of rotational symmetry, said peripheral flank surface being configured to provide a plurality of abutment surfaces, a first of said abutment surfaces forming an angle substantially equal to 90° with a second of said abutment surfaces as measured in a plane perpendicular to said central axis, wherein said cutting edge includes at least two cutting points having a nose angle measured between portions of said cutting edge substantially equal to 80°.

7. The cutting insert of claim 6, wherein said cutting edge is substantially diamond shaped.

8. The cutting insert of claim 6, wherein said cutting edge includes four cutting points having a nose angle substantially equal to 80°.

\* \* \* \* \*